Figure 1:
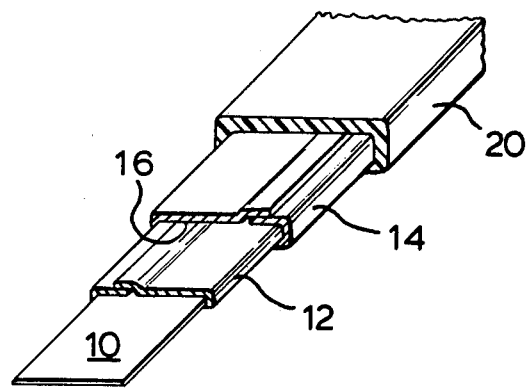

United States Patent [19]

Bendyshe Walton et al.

[11] 4,389,580

[45] Jun. 21, 1983

[54] FLEXIBLE TAPE ELECTROACOUSTIC TRANSDUCER USING AN ELECTRET

[75] Inventors: Andre P. J. Bendyshe Walton, Guildford; Francis H. Townsend, Alton; John N. Ribet, East Twickenham, all of England

[73] Assignee: C. Tape Developments Limited, Four Marks, England

[21] Appl. No.: 227,476

[22] Filed: Jan. 22, 1981

[30] Foreign Application Priority Data

Mar. 3, 1980 [GB] United Kingdom ............... 8007167

[51] Int. Cl.³ ............................................. H04R 23/00
[52] U.S. Cl. .................................... 307/400; 340/540; 340/550; 340/621
[58] Field of Search ............... 307/400; 29/592 E; 179/111 E; 340/540, 550, 621; 365/146

[56] References Cited

U.S. PATENT DOCUMENTS

| | | | |
|---|---|---|---|
| 2,990,543 | 6/1961 | Rod | 340/621 |
| 3,705,312 | 12/1972 | Sessler et al. | 307/400 |
| 3,763,482 | 10/1973 | Burney et al. | 307/400 |
| 3,809,828 | 5/1974 | Haugsjaa et al. | 307/400 |
| 3,821,491 | 6/1974 | Whetstone et al. | 307/400 |
| 3,889,250 | 6/1975 | Solomon | 340/540 |

*Primary Examiner*—James W. Moffitt
*Attorney, Agent, or Firm*—Lewis Messulam

[57] ABSTRACT

An electroacoustic transducer is provided in the form of a flexible tape formed of an inner flat metal foil 10 surrounded by a metal foil 14 and separated from the latter by an electret 12. The outer metal foil 14 is in turn surrounded by a PVC outer layer 20. This construction provides a flexible electret type of microphone with the additional advantage of immunity from ambient acoustic waves and electrical and magnetic fields.

6 Claims, 2 Drawing Figures

U.S. Patent    Jun. 21, 1983    4,389,580

FLEXIBLE TAPE ELECTROACOUSTIC TRANSDUCER USING AN ELECTRET

The present invention relates to an electro-acoustic transducer and in particular a transducer intended for detecting vibrations of a solid surface, for example part of the structure of a musical instrument.

The detection of audio frequency waves such as those produced by a musical instrument is well known. Detection devices for this purpose, for example microphones, can be used to convert an acoustic wave into an electrical signal which in turn can be used for magnetic recording or amplification purposes.

The use of a microphone for detection purposes has certain disadvantages. When the signal is fed from a microphone to an amplifier and then to a loudspeaker, a feedback loop is produced which tends to oscillate if the amplification is excessive. This produces a loud and irritating sound.

A further disadvantage of the use of the microphone is its limited ability to distinguish between sounds produced by one musical instrument and another. Even with directional microphones it is difficult to separate the sounds produced by the different instruments in an orchestra and this is sometimes desirable, for example when making a recording when a recording editor may wish to emphasise the sound from a particular instrument.

The present invention therefore seeks to provide a simple electroacoustic transducer capable of detecting sounds propagating through a solid surface while being substantially less sensitive to sounds propagating through the surrounding air.

In accordance with the present invention, there is provided a transducer in the form of a flexible tape conformable to a surface to detect acoustic waves propagating along the surface, the transducer comprising a first flat metal foil, an outer metal foil wrapped around the first metal foil and separated therefrom by a dielectric material acting as an electret and means for applying a d.c. voltage across the electret in a sense to enhance the polarisation within the electret, the outer metal foil being maintained at earth potential. There is known from British Patent Specification No. 1,376,335 an ultrasonic transducer which employs an electret. Such a transducer configuration, essentially consisting of two spaced-apart plates and an interposed electret, cannot of itself act for detecting sounds of musical instruments. A primary reason for this is that the system would inevitably pick up and reproduce electric fields such as might be caused by nearby power cables. The construction of the present invention wherein the outer conductor envelops the inner foil and is earthed essentially shields the electret from ambient electric fields.

The conformable nature of the tape enables the transducer to be adhered to the body of, say, a guitar to enable the sound of the guitar to be reproduced but not other sounds, for example a vocalist.

Though primarily intended for a transducer operating in the audio range, the invention may be used to detect signals outside that range while still offering the advantage of immunity from ambient noise and ambient electric fields. Thus, the transducer may be employed to listen to noises generated within the a structure such as might be caused by crack propagation, excessive bending, etc. By the use of the transducer, it is possible to detect imminent danger of collapse, the advantage of the transducer in this application being immunity to ambient noise and ambient electric and magnetic fields.

Figure 2:
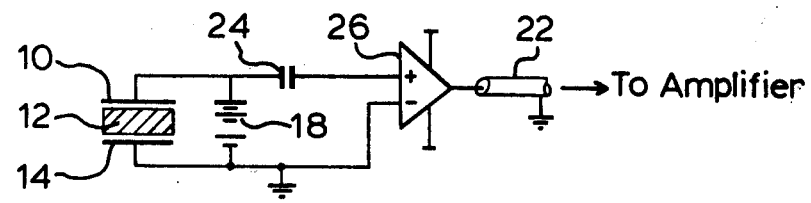

The invention will now be described further, by way of example, with reference to the accompanying drawings, in which:

FIG. 1 is a perspective view of a transducer with the various layers of the transducer exposed, and FIG. 2 is a circuit diagram showing the transducer in use.

In FIG. 1 there is shown a transducer which comprises a first flat metal foil 10 which may, for example, be aluminium foil. A dielectric tape 12 is wrapped around the metal foil 10 and overlaps to envelop the flat foil completely. The dielectric tape 12 may conveniently be a self-adhesive tape of a polarised plastics or electret material, the polarisation either being automatically built into the film during the manufacturing process or subsequently produced by heating the film and allowing it to cool down while applying an external electric field.

An outer metal foil 14 is wrapped around the dielectric film 12, the inner surface 16 of the metal foil 14 being coated with a dielectric resin such as a vinyl resin. It has been found that the dielectric resin coating improves the frequency response of the transducer when it is used as an audio frequency pick-up. The resin coating may either be formed as part of the metal foil 14 or applied subsequently by spraying. A PVC or other suitable plastics tape 20 is wrapped around the outer metal foil 14 and provides electrical insulation as well as sealing the inner foils and the electret against chemical attack. A coaxial cable, not shown, is connected by means of a suitable adaptor at the end of the transducer such that the outer conductor is in electrical contact with the outer foil 14 and the inner conductor is connected to the inner foil 10.

In use, the transducer, which has the form of a flexible tape, is adhered to a surface in which sound is propagating, for example the body of a guitar. The underside of the PVC outer coating 20 may be provided with an adhesive layer or alternatively a double sided adhesive tape may be employed to secure the transducer to the surface in question.

FIG. 2 shows the transducer connected in circuit. A d.c. power supply 18 is connected across the inner and outer metal foils 10 and 14 to apply an electric field in a direction to enhance the polarisation in the electret. Acoustic waves cause variations in the separation of the inner and outer metal foils, causing fluctuation of the voltage between the inner and outer foils. The a.c. voltage is decoupled by means of a capacitor 24 and applied to an input of a buffer amplifier 26 having a high input impedance. The buffer amplifier 26 may, for example, be constructed with a field effect transistor input stage or it may be constituted as an operational amplifier. The output of the buffer amplifier 26 is fed by way of a coaxial cable 22 to the main amplifier.

Though primarily intended for amplification of audio frequency sounds generated by musical instruments, the transducer has alternative uses for listening to sounds generated within solid bodies. For example, the transducer may be used to listen to cracks to indicate imminent fracture of a structure. It has been found that certain frequencies outside the audio range provide an accurate guide of such imminent failures.

A further possible use of the transducer is for incorporation as part of a burglar alarm system to detect breakage of a window. Once again, in this application the transducer would be specifically intended to listen to a frequency generated by cracks propagating through glass and could therefore be immune to ambient noise.

A still further use of a transducer is as part of a level detecting apparatus to detect the level of liquid or flowable solid within a container. A full container is more severely damped than an empty container and it is possible for a first transducer to introduce an acoustic wave and a second to pick up the acoustic wave, the attenuation being indicative of the fluid level.

We claim:

1. A transducer in the form of a flexible tape comformable to a surface to detect acoustic waves propagating along the surface, the transducer comprising a first flat metal foil, an outer metal foil which is wrapped around the first metal foil so as to envelop said first metal foil and which is separated therefrom by a dielectric material acting as an electret and means for applying a d.c. voltage across the electret in a sense to enhance the polarisation within the electret, the outer metal foil being maintained at earth potential.

2. A transducer as claimed in claim 1, wherein the outer metal foil has on its inner surface a coating of a dielectric resin.

3. A transducer as claimed in claim 2, wherein the outer metal foil is surrounded by an insulating plastics envelope.

4. A system for detecting imminent mechanical failure of a structure which comprises a transducer as claimed in claim 1 adhered to a solid surface of the structure and a circuit responsive to detected acoustic signals lying within a predetermined frequency band.

5. A burglar alarm system incorporating means for detecting breakage of a glass panel, the said means comprising an electroacoustic transducer as claimed in claim 1, connected to a circuit responsive to signals lying within a predetermined frequency range.

6. Level detecting apparatus for detecting the level of a liquid within a container, which comprises an electroacoustic transducer for transmitting an acoustic signal in a wall of the container, an electroacoustic transducer as claimed in claim 1 for detecting an acoustic signal transmitted through the walls of the container and means for measuring the attenuation of the acoustic signal to provide an indication of the fluid level.

* * * * *